United States Patent [19]

Ishii et al.

[11] Patent Number: 5,275,456
[45] Date of Patent: Jan. 4, 1994

[54] GLOVE BOX DAMPER ARRANGEMENT FOR VEHICLE

[75] Inventors: Toru Ishii, Sagamihara; Takehiro Terai, Atsugi, both of Japan

[73] Assignee: Nissan Motor Co., Ltd., Yokohama, Japan

[21] Appl. No.: 903,101

[22] Filed: Jun. 23, 1992

[30] Foreign Application Priority Data

Jun. 24, 1991 [JP] Japan ..................... 3-151940

[51] Int. Cl.⁵ ................................. B60R 7/06
[52] U.S. Cl. ..................... 296/37.12; 49/386; 16/85; 312/319.2
[58] Field of Search .......... 296/37.9, 37.12; 16/78, 16/85; 312/319.2, 319.3; 224/282; 280/732; 49/386

[56] References Cited

U.S. PATENT DOCUMENTS

| | | | |
|---|---|---|---|
| 1,963,388 | 6/1934 | Smith | 312/319.2 X |
| 2,187,320 | 1/1940 | Hoffstetter et al. | 312/319.2 X |
| 4,786,098 | 11/1988 | Jobmann et al. | 296/37.12 |

FOREIGN PATENT DOCUMENTS

| | | | |
|---|---|---|---|
| 0378314 | 7/1990 | European Pat. Off. | 280/732 |
| 50135 | 1/1889 | Fed. Rep. of Germany | 49/386 |
| 983533 | 6/1951 | France | 49/386 |
| 63-196752 | 12/1988 | Japan . | |
| 510464 | 8/1939 | United Kingdom | 296/61 |

*Primary Examiner*—Dennis H. Pedder
*Attorney, Agent, or Firm*—Lowe, Price, LeBlanc & Becker

[57] ABSTRACT

A damper arrangement for a glove box of an automotive vehicle is mounted separately from the glove box compartment in a space between other components mounted in an instrument panel of the vehicle. A pulley is mounted separate from both the glove box damper and the glove box compartment. A wire connects the glove box damper to a movable member associating the glove box compartment with a glove box lid via the pulley.

5 Claims, 5 Drawing Sheets

GLOVE BOX DAMPER ARRANGEMENT FOR VEHICLE

BACKGROUND OF THE INVENTION

1. Field of the Invention

The present invention relates generally to a damper arrangement for a glove box of an automotive vehicle. Particularly, the present invention relates to a glove box damper arrangement which can be operatively mounted behind a vehicle instrument panel without interfering with other vehicle components and without need for reducing the size of a glove box.

2. Description of the Prior Art

In a conventional damper for a vehicle glove box, the glove box is included in an instrument panel of a vehicle, the instrument panel may further accommodate an air bag module mounted in proximity thereto and may further include a cooler unit for example. A lid of the glove box is connected by a wire to the glove box damper such that the lid of the glove box will open slowly. The glove box damper is normally installed on an outer surface of the glove box, such as on a rear surface thereof or on a side surface.

Such a conventional glove box damper is disclosed in, for example, Japanese Utility Model application No. 63-196752. According to this disclosure, a lid for a glove box is rotatable hinged at a lower portion thereof to open in a downward direction. According to such arrangement the glove box damper is provided at a side or rear portion thereof.

However, given the increasing number of components mounted in vehicle instrument panels and the need for safety devices such as air bag modules, it has been required to provide a glove box damper arrangement which does not reduce a glove box capacity as with a rear mounted glove box damper, and yet assures a necessary stroke length for effective damping and full opening of the glove box which is often not achieved by side mounted glove box damper arrangements.

SUMMARY OF THE INVENTION

It is therefore a principal object of the present invention to overcome the drawbacks of the prior art.

In order to accomplish the aforementioned and other objects, a damper arrangement for a rotatable compartment is provided, comprising: a steering member extending laterally behind the instrument panel and the mounting thereon an air bag module, a compartment installed in the instrument panel such that one side thereof is opened to the outside of the instrument panel, a compartment lid installed at one open side of the compartment and pivotally installed at a lower side of the open side so as to be swingably movable for opening and closing the compartment, a movable connecting member connecting the compartment and the lid at one side thereof, dampening means active to dampen opening and closing motion of the compartment lid, a mounting bracket mounting the dampening means, the mounting bracket being attached to a second bracket mounting the air bag module on the steering member such that the dampening means is projected rearward of the air bag module so as to be axially parallel to the steering member, a pulley mounted on a side of the steering member corresponding to a side of the compartment on which the movable connecting member is provided, and flexible connecting means connected between the dampening means and the connecting means via the pulley.

DESCRIPTION OF THE PREFERRED EMBODIMENT

Figure 1:
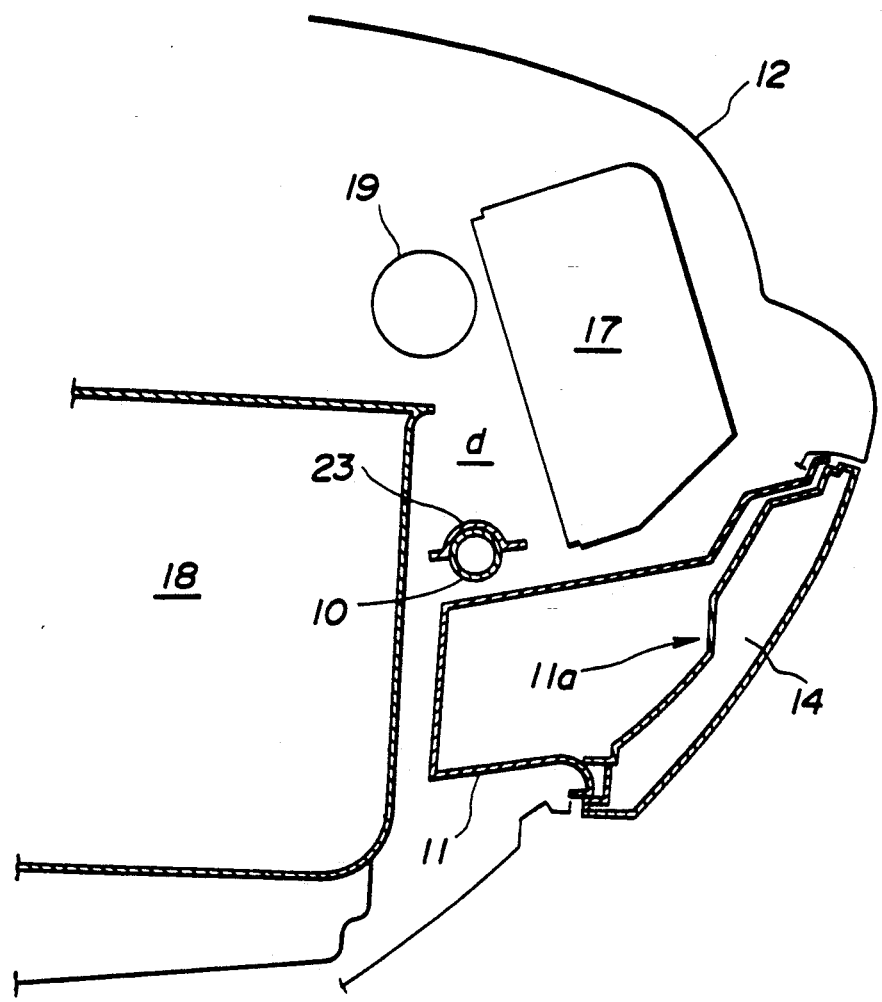
FIG. 1 shows a cross-sectional view of a glove box and glove box damper arrangement installed in a vehicle according to the invention.
Figure 2:
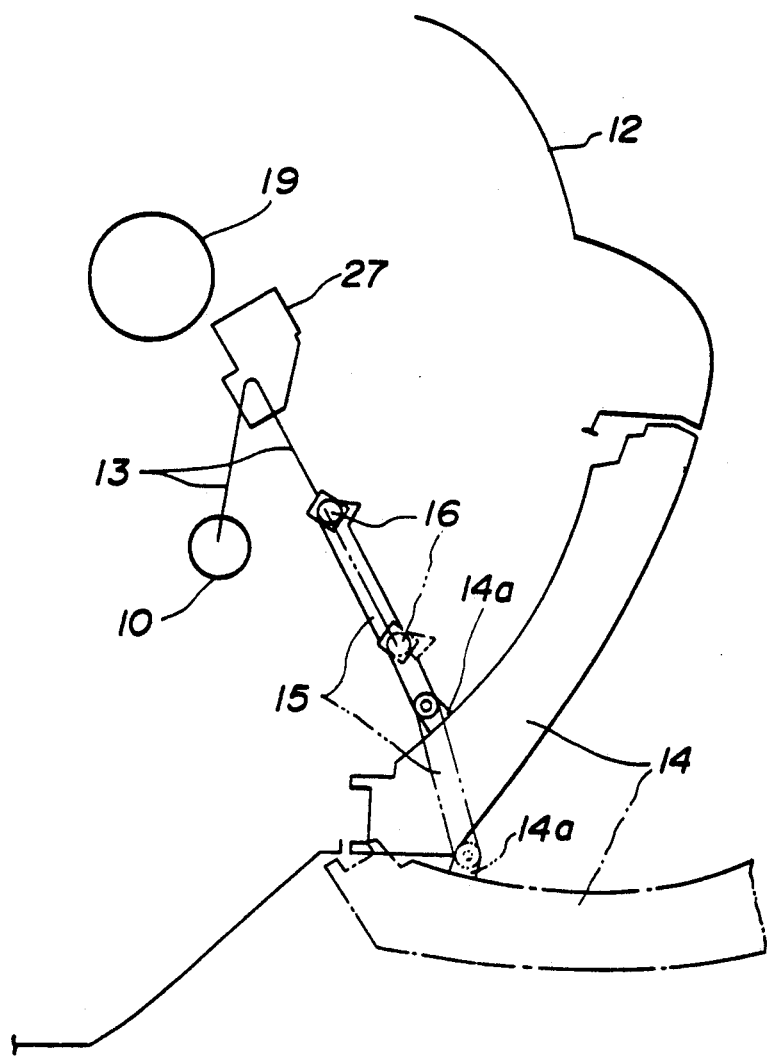
FIG. 2 is side view of a glove box and glove box damper according to the invention in an open position of the glove box.
Figure 6:
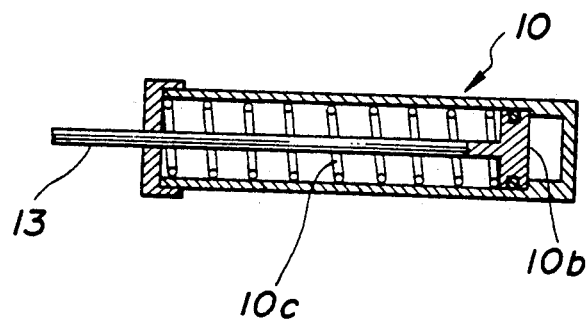
FIG. 6 shows a cross-sectional view of a glove box damper employed in the glove box damper arrangement of the invention.

Referring now to the drawings, particularly to FIG. 1, a glove box damper 10 and a glove box 11 are installed in an instrument panel 12 of a vehicle (not shown). The glove box damper 10 is associated with an end of a wire 13. As seen in FIG. 2, a clip 16 is associated with the glove box 11, the clip 16 being connected to another end of the wire 13. Referring to FIG. 6, the end of the wire 13 associated with the glove box damper 10 is directly connected to a piston 10b inside the glove box damper which is biased by a coil spring 10c for providing a load thereto for effecting damping of opening motion of the glove box 11.

The glove box 11 is installed in the instrument panel 12 such that a mouth, or open side 11a thereof faces outward of the instrument panel 12. A lid 14 is installed over the mouth 11a of the glove box 11 so as to be freely movable between and open and closed position. When the lid 14 is closed, the outer surface thereof is shaped so as to form a substantially contiguous surface with the outer surface of the instrument panel 12. Further, referring to FIG. 2, an inner side 14a of the lid 14 is connected to one end of a stopper 15, another end of the stopper being connected to the clip 16 which is attached to an outer side surface of the glove box 11.

According to the present embodiment, and as seen in FIG. 1, an air bag module 17 is mounted above the glove box 11 at mounting portions 17a provided on each side thereof. Further, proximate the air bag module 17, a cooler unit 18 is mounted and, in the longitudinal direction of the instrument panel, a steering member 19 is provided. The steering member is provided above the glove box 11 and between the air bag module 17 and the cooler unit 18. Further, a dead space d exists between the upper side of the glove box 11, the cooler unit 18, the air bag module 17 and the steering member 19. As seen in FIG. 1, the glove box damper 10 is mounted so as to be operative within this space d.

Figure 3:
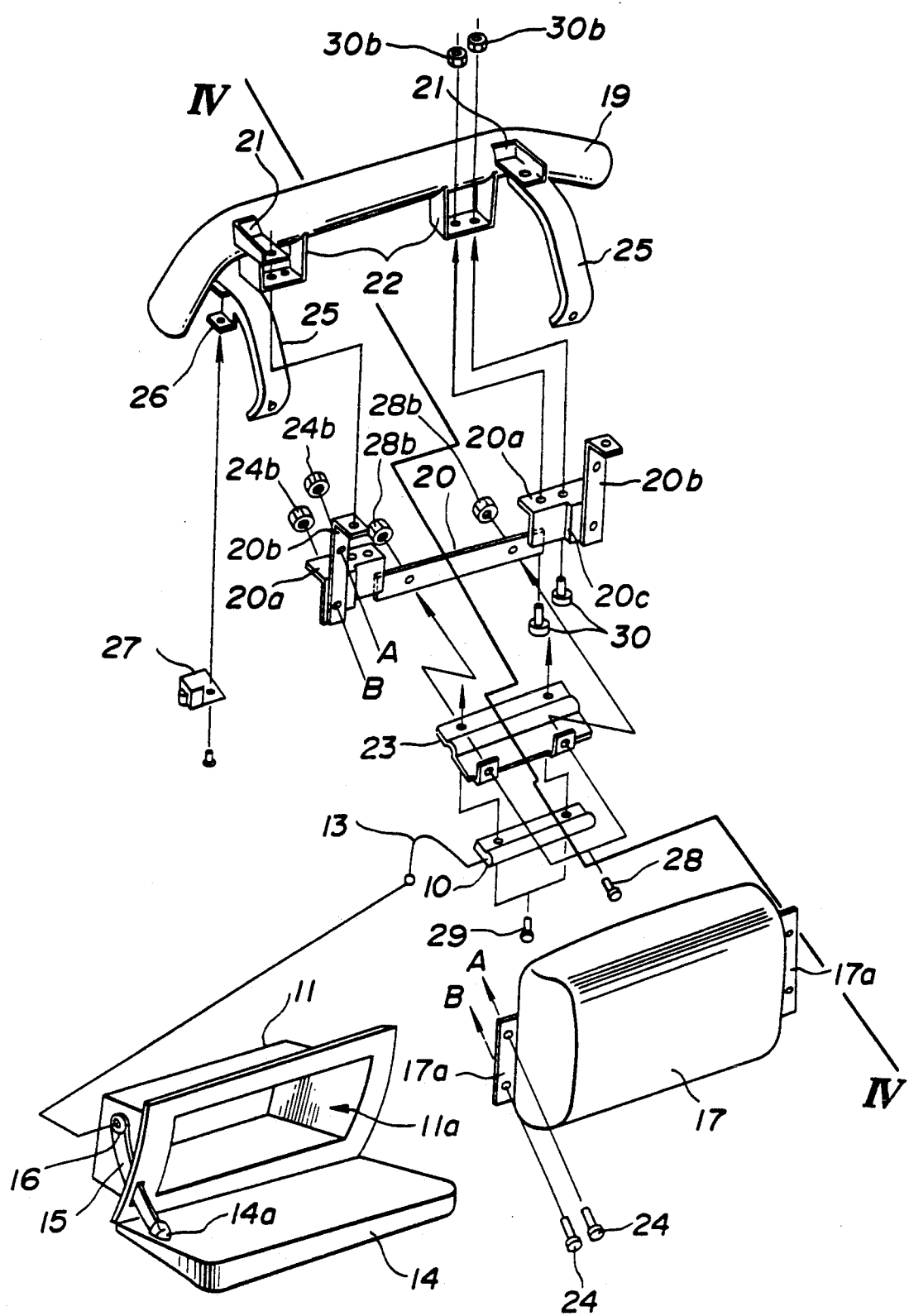
FIG. 3 is an exploded perspective view of a glove box and glove box damper arrangement according to the invention.
Figure 4:
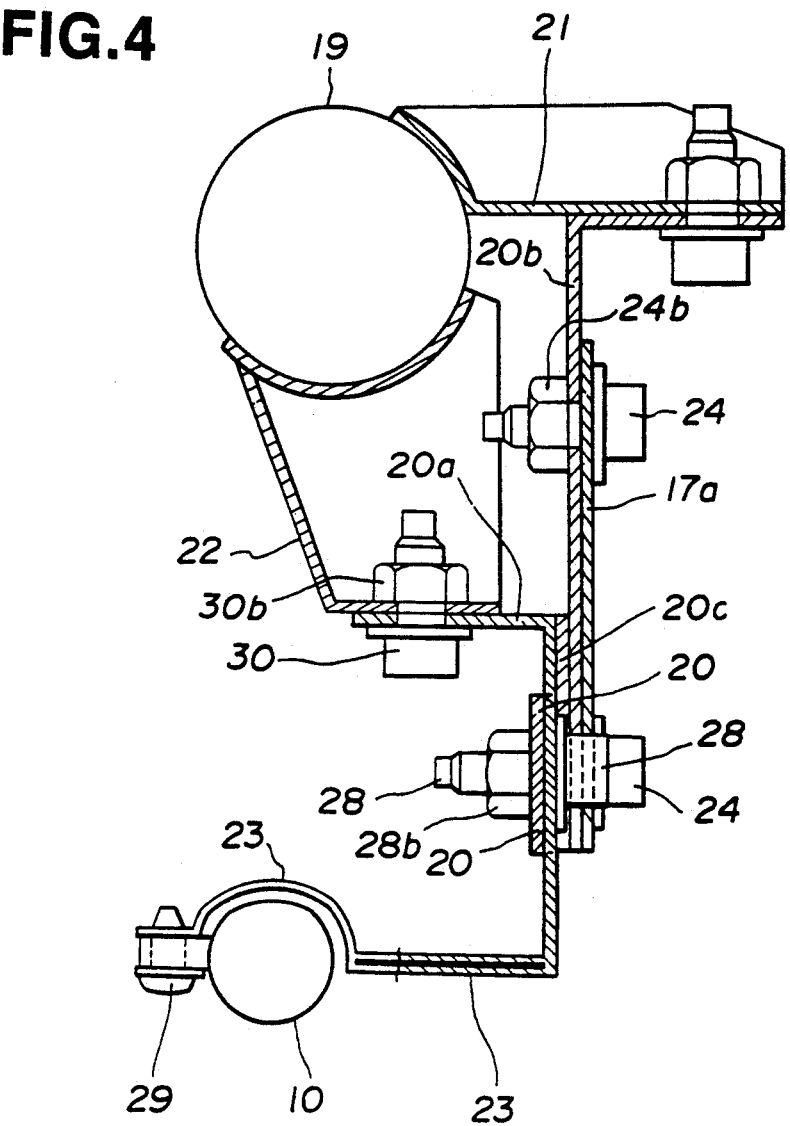
FIG. 4 is a cross-sectional view of the assembled bracket arrangement of the invention taken along line IV—IV of FIG. 3.

Referring to FIGS. 3 and 4, an airbag module mounting bracket 20 for the air bag module 17 is positioned between the steering member 19 and the module 17.

The bracket 20 is provided on both sides thereof with inverted L-shaped first brackets 20a which include a corner portion 20c and which are attached to lower brackets 22 of the steering member 19. Also attached on both sides of the bracket 20 are reverse, inverted L-shaped second brackets 20b, which are taller that the brackets 20a, which are attached to upper brackets 21 of the steering member 19. The air bag module 17 is fastened to the airbag module mounting bracket 20 at both sides thereof at points indicated as A and B in FIGS. 3 and 4, via the mounting portions 17a by bolts 24 and nuts 24b, for example. At a center portion of the airbag module mounting bracket 20, a damper bracket 23 is provided to be held to the airbag module mounting bracket 20 via bolts 28 and nuts 28b or alternatively, screws may also be utilized. The glove box damper 10 is fastened to a lower surface of the damper bracket 23 by screws 29, for example.

Further, as seen in FIG. 3, the steering member 19 has an installation bracket 25 projecting from both sides thereof corresponding to both sides of the glove box 11. The installation bracket 25 is provided with a bracket 26 for mounting pulley 27 on a side corresponding to the side of the glove box 11 to which the stopper 15 is attached. The pulley 27 being attached to the bracket 26 by a screw, for example.

Next, installation of a glove box 11 and glove box damper 10 according to the invention will be explained hereinbelow.

As stated above, the glove box damper 10 is positioned in the dead space, or gap d behind the instrument panel 12. As seen in FIG. 2, the wire 13 extends from the glove box damper 10 over the pulley 27 and then extends downwardly to attach to the clip 16 of the stopper 15. As seen in the drawing the glove box 11 is positioned separate from the glove box damper 10, the wire 13 being connected to the stopper 15 via the clip 16. With this arrangement, the glove box damper 10 is effective for permitting opening and closing of the lid 14 of the glove box 11 and providing appropriate damping therefor. According to this arrangement, sufficient stroke length for effective damping is sufficiently provided.

Figure 5:
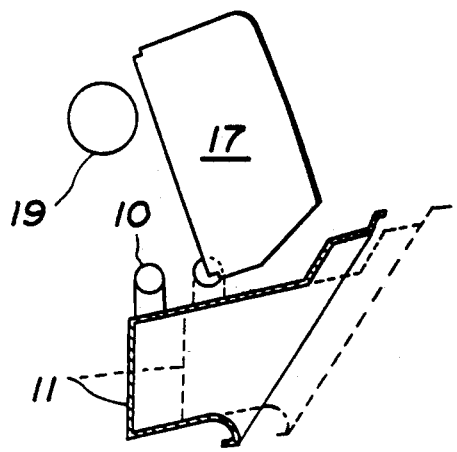
FIGS. 5(a) and (b) show cross-sectional views of a conventionally mounted glove box damper.
FIG. 5(c) shows a cross-sectional view of a glove box damper mounted according to the structure of the invention.
Figure 5:
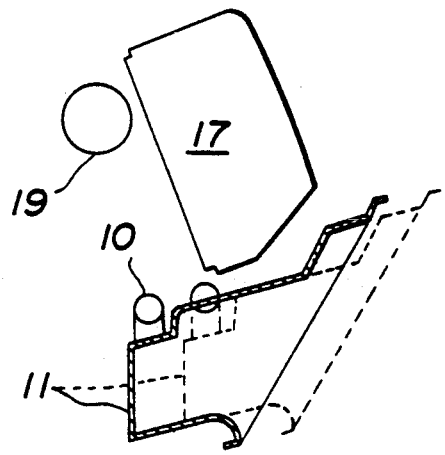
Figure 5:
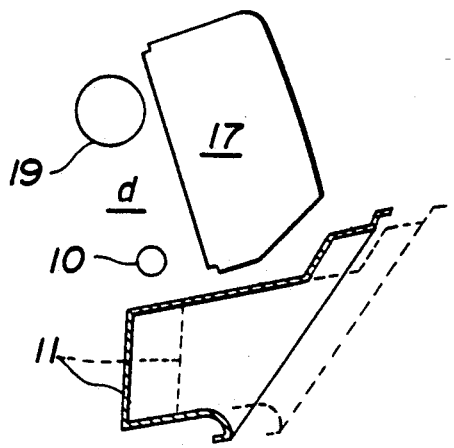

If the glove box damper 10 is attached directly to a top portion of the glove box 11, the glove box damper 10 interferes with installation of an air bag module 17 installed over the glove box 11. In order to prevent this, an installation space must be found on the glove box 11 for installation of the glove box damper which does not interfere with the air bag module 17. However, in such case, such as if the glove box damper 10 is installed on a recess at a rear side of the glove box 11, a capacity of the glove box 11 is reduced undesirably. Also as stated above, if the glove box damper 10 is located at a side of the glove box 11, sufficient stroke length cannot be assured. However, as seen in FIG. 5, if the glove box damper 10 is mounted separately from the glove box 11, in a space between other components such as a cooler unit 18 and an air bag module 17, for example, sufficient stroke length for the glove box damper 10 can be assured, other components are not interfered with and the capacity of the glove box 11 is not compromised.

Thus according to the invention a glove box damper may be provided which has sufficient stroke length and which allows a maximum capacity for a vehicle glove box to be realized.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A damper arrangement for a reclosable compartment installed in an instrument panel of a vehicle comprising:
   a steering member extending laterally behind said instrument panel, said steering member having an air bag module mounted thereon;
   a compartment installed in said instrument panel such that one side thereof is open to the outside of said instrument panel;
   a compartment lid, installed at said open side of said compartment and pivotally attached to a lower side of said open side so as to be swingably movable for opening and closing said compartment;
   a movable connecting member connecting said compartment and said compartment lid at one side thereof;
   damping means mounted in said instrument panel, said damping means being mounted to said steering member in a space in said instrument panel;
   a pulley mounted to said steering member on to the side of said compartment on which said movable connecting member is provided; and
   flexible connecting means connected between said damping means and said connecting member via said pulley.

2. A damper arrangement as set forth in claim 1, wherein said space exists between a cooling unit, said steering member, said air bag module and said compartment.

3. A damper arrangement as set forth in claim 1, wherein said air bag module is mounted on said steering member by means of a bracket mounting which includes, at each side thereof, a first inverted L-shaped bracket attached to said steering member at a first corresponding bracket of said steering member and a reversed inverted L-shaped second bracket, at an elevation higher than said first bracket, attached to said steering member at a second corresponding bracket thereof.

4. A damper arrangement as set forth in claim 1, wherein said damping means is of cylindrical construction including a coil spring and a piston within said cylindrical construction, said flexible connecting means being connected to said piston.

5. A damper arrangement as set forth in claim 1, wherein said flexible connection means is a wire.

* * * * *